Dec. 18, 1956   G. GUIGAS   2,774,489
STACKING AND UNSTACKING MACHINE
Filed Dec. 17, 1954   9 Sheets-Sheet 1
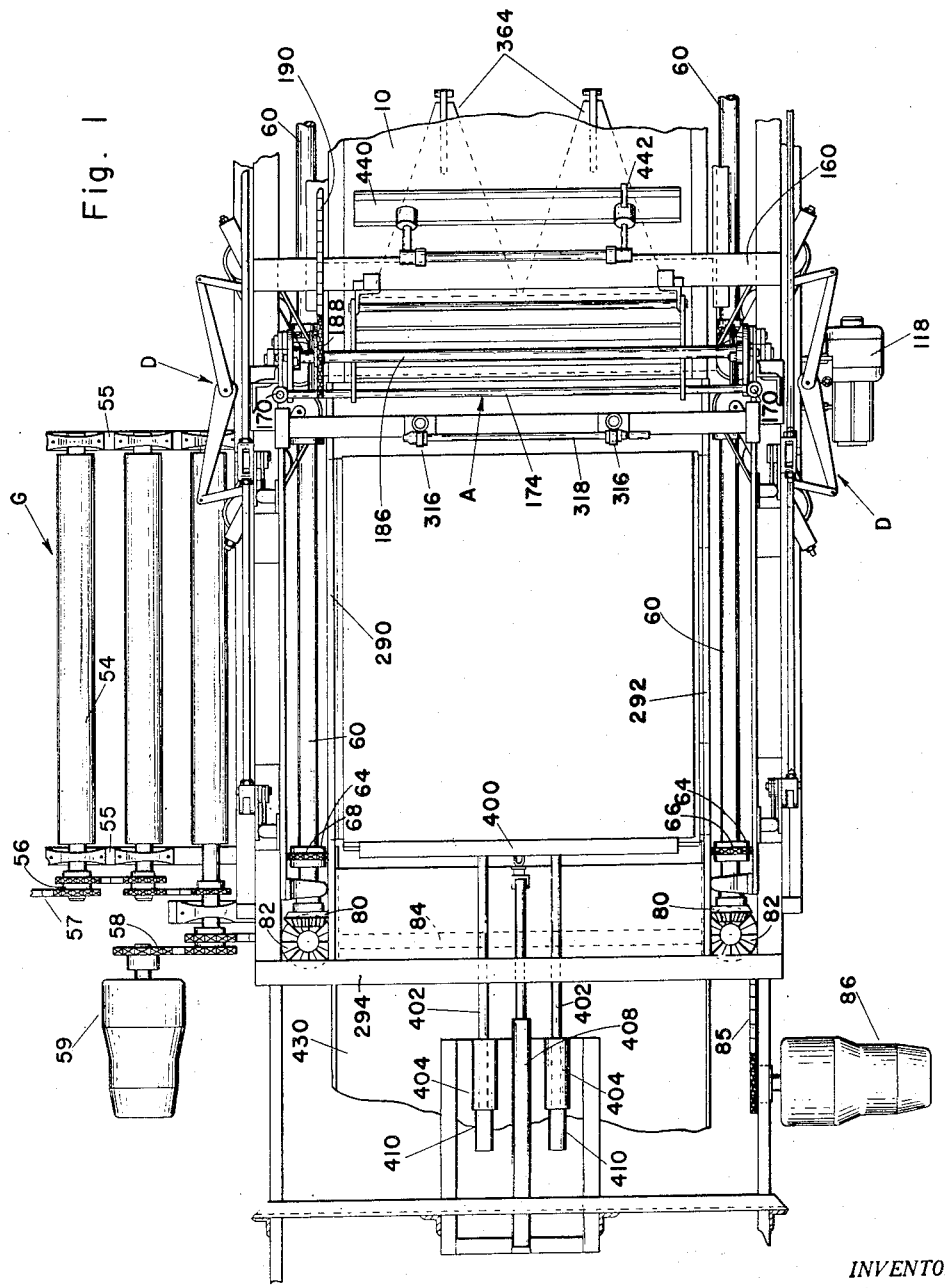
INVENTOR.
Gustav Guigas
BY *RW Furlong*
ATTY.

Dec. 18, 1956   G. GUIGAS   2,774,489
STACKING AND UNSTACKING MACHINE
Filed Dec. 17, 1954   9 Sheets-Sheet 3

INVENTOR.
Gustav Guigas
BY RW Furlong
ATTY.

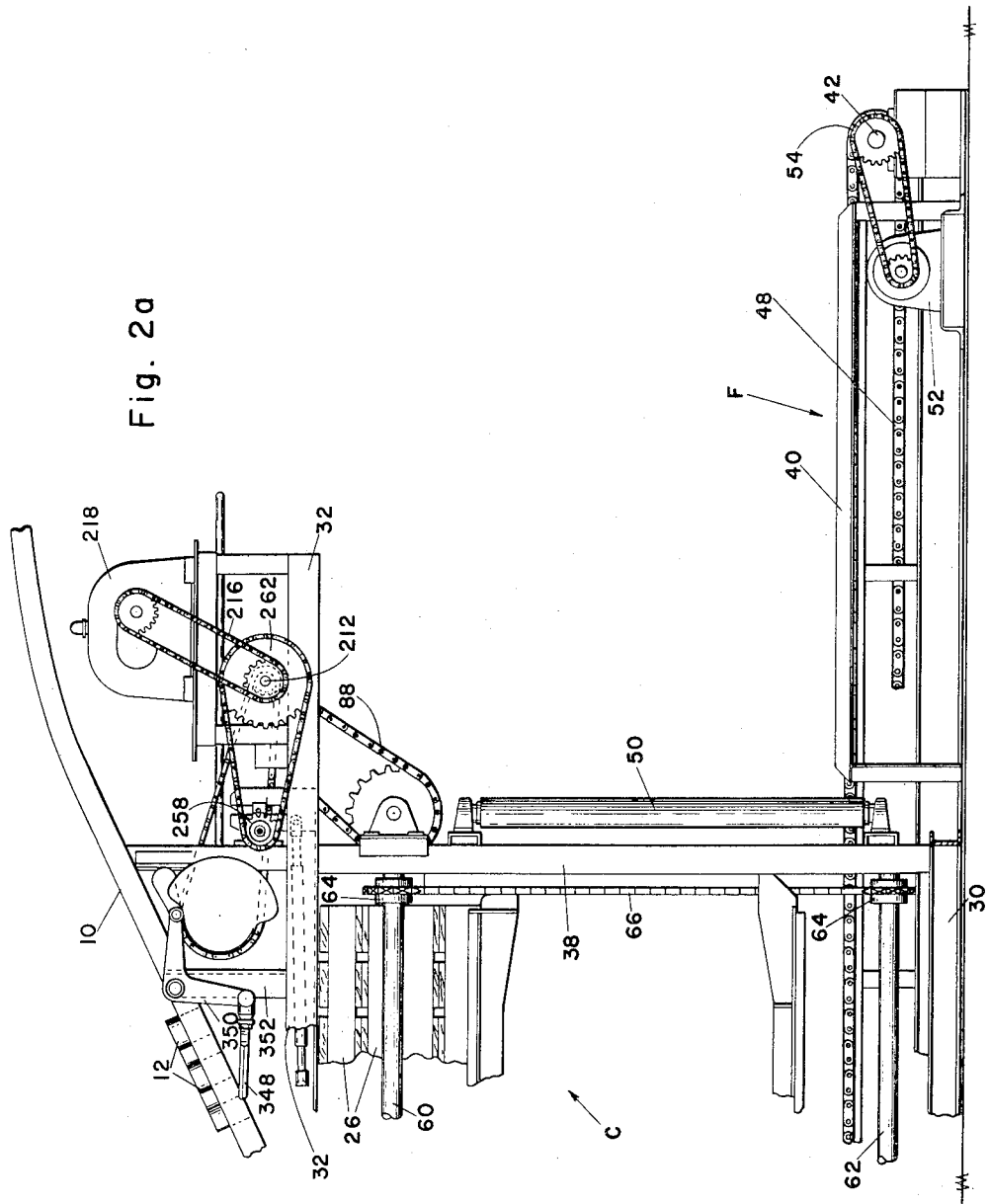

Dec. 18, 1956  G. GUIGAS  2,774,489
STACKING AND UNSTACKING MACHINE
Filed Dec. 17, 1954  9 Sheets-Sheet 5
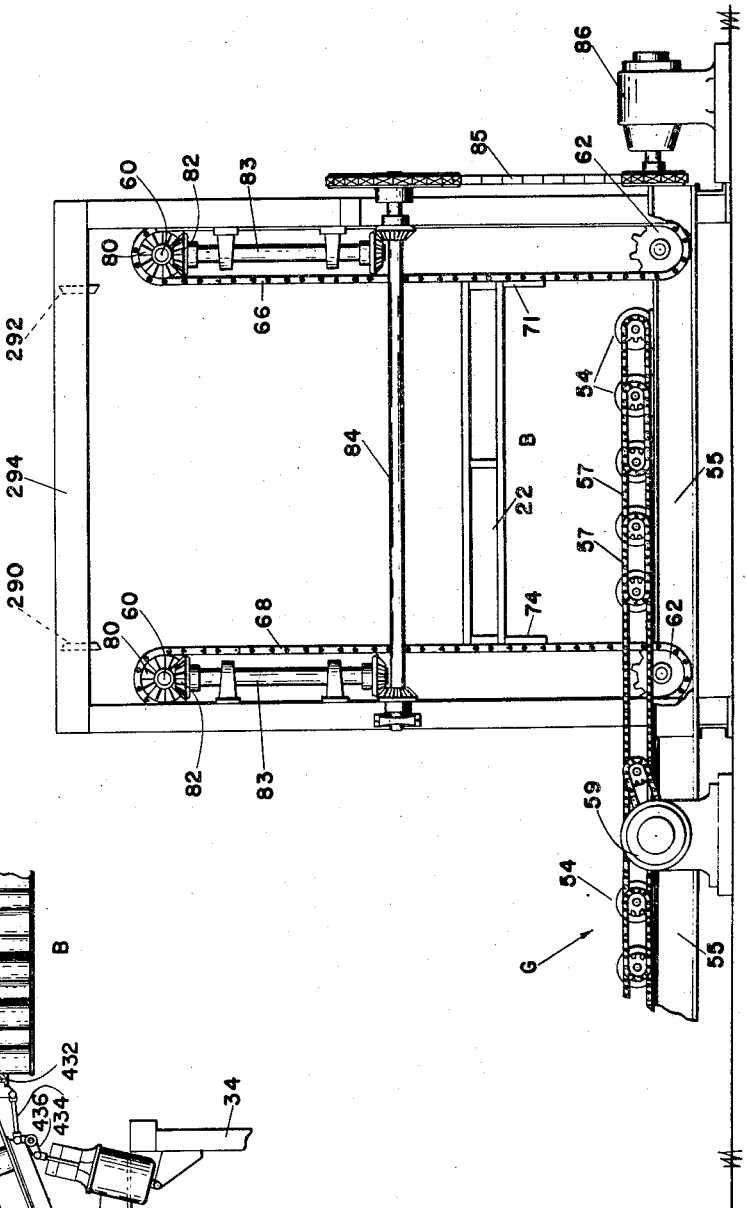
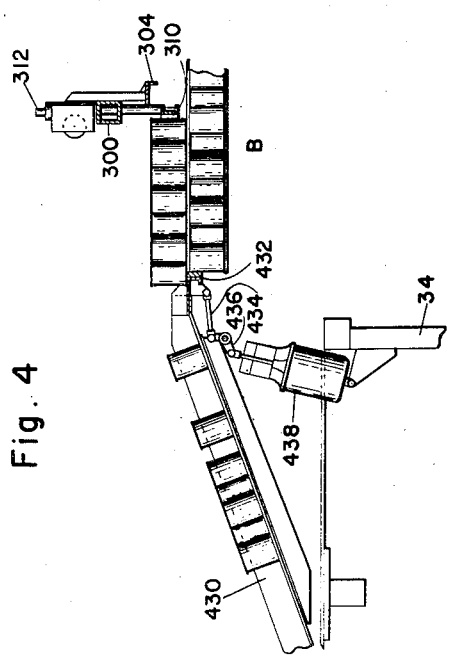
INVENTOR.
Gustav Guigas
BY RW Furlong
ATTY.

Dec. 18, 1956 G. GUIGAS 2,774,489
STACKING AND UNSTACKING MACHINE
Filed Dec. 17, 1954 9 Sheets-Sheet 6
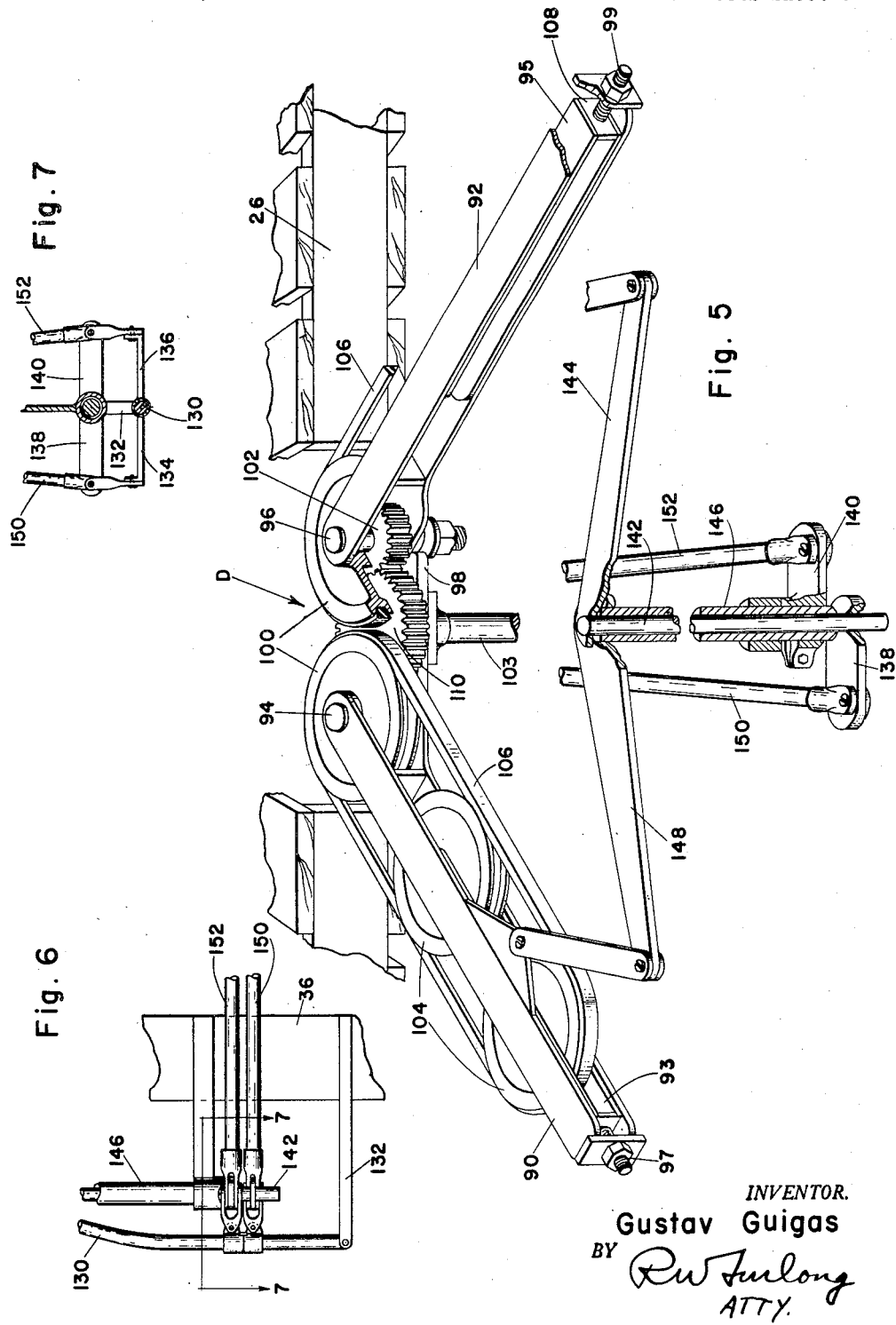
INVENTOR.
Gustav Guigas
BY R W Furlong
ATTY.

Dec. 18, 1956  G. GUIGAS  2,774,489
STACKING AND UNSTACKING MACHINE
Filed Dec. 17, 1954  9 Sheets-Sheet 7

INVENTOR.
Gustav Guigas
BY R W Furlong
ATTY.

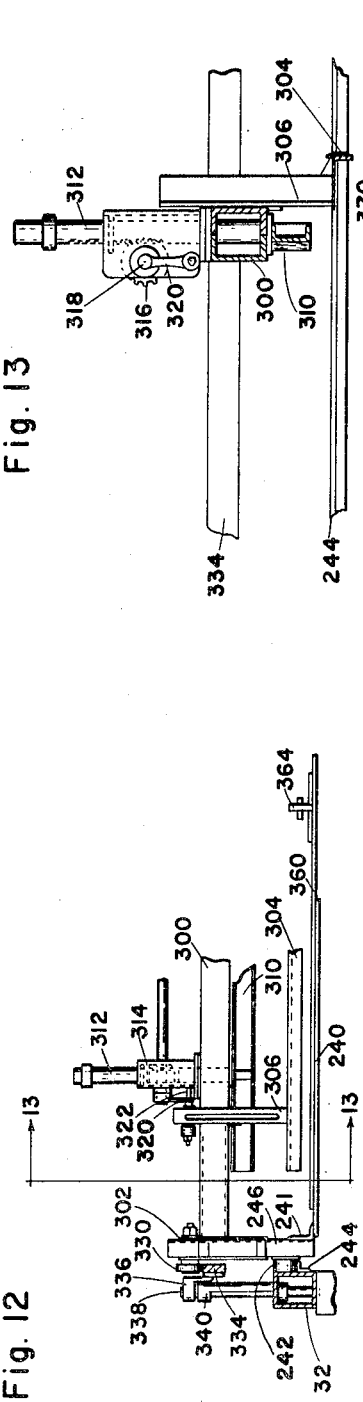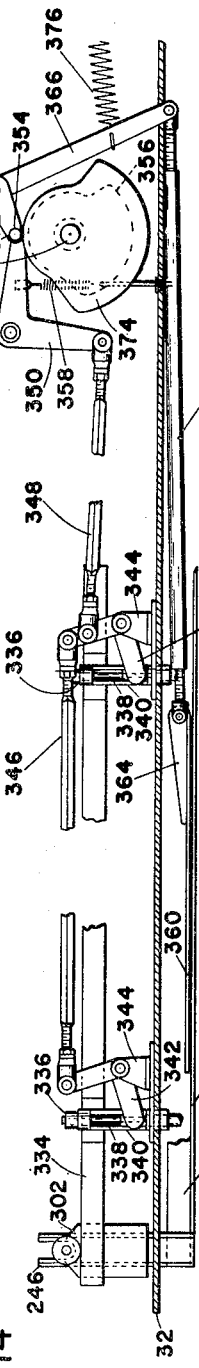

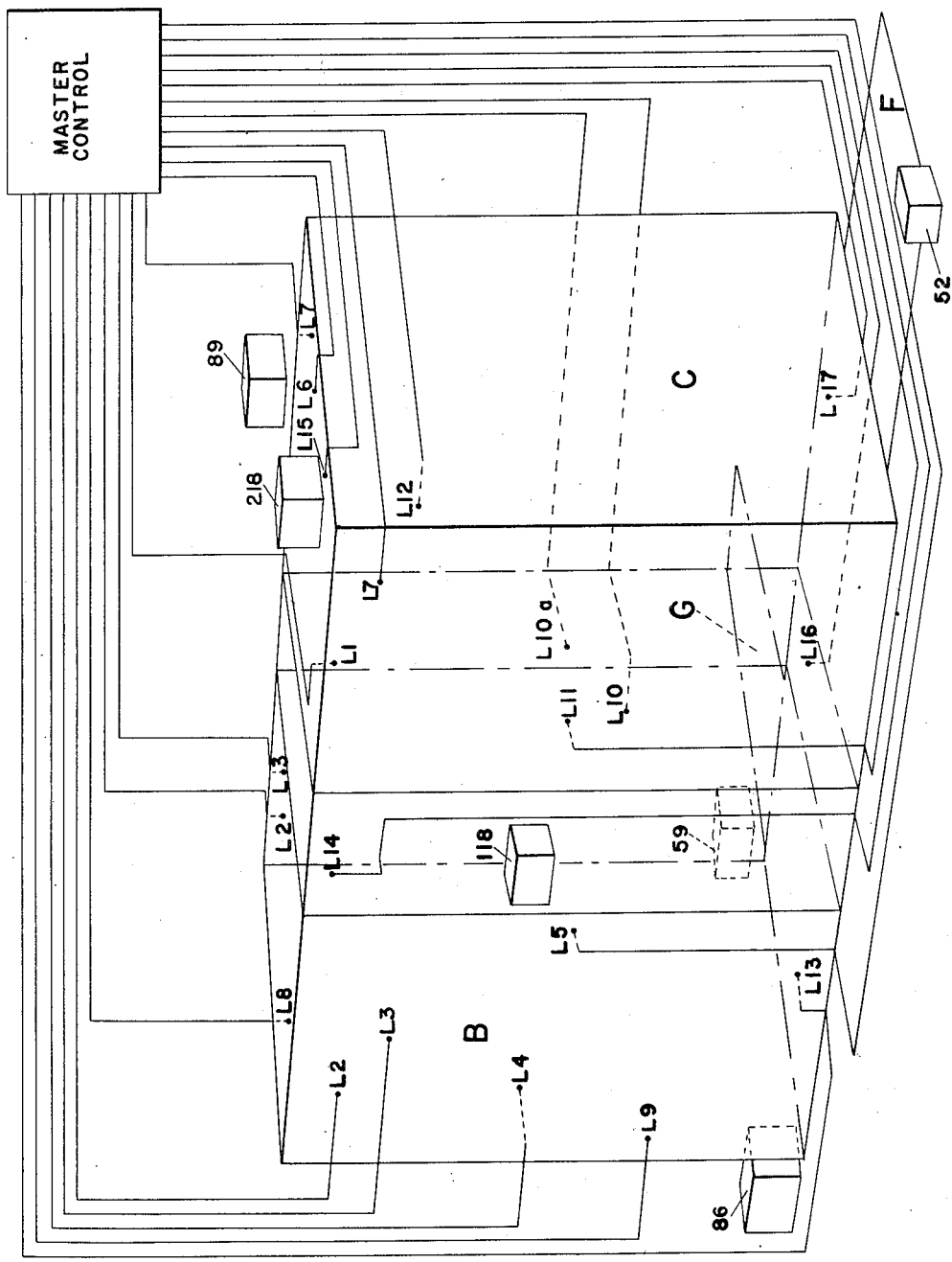

United States Patent Office 2,774,489
Patented Dec. 18, 1956

2,774,489
STACKING AND UNSTACKING MACHINE

Gustav Guigas, Honolulu, Territory of Hawaii, assignor to Hawaiian Pineapple Company, Limited, Honolulu, Territory of Hawaii, a corporation of Hawaii Application December 17, 1954, Serial No. 476,021

16 Claims. (Cl. 214—6)

This invention relates to an apparatus which may be used interchangeably for loading and unloading articles on pallets and pertains more specifically to a device for stacking cans on a pallet and unstacking therefrom.

One object of the invention is to provide an apparatus for receiving a supply of articles and a supply of pallets and for stacking layers of articles upon successive pallets.

Another object is to provide an apparatus for receiving a stream of cans from a conveyor or the like, apportioning the stream into individual loads, each of the proper size to form a single layer on the pallet, and depositing successive loads on a pallet in superposed layers to form a stack.

A further object is to provide an apparatus which, by means of a few simple adjustments, may be used interchangeably for forming a stack of articles upon a pallet and for unstacking articles from pallets by seriatim removal of successive layers to provide a stream of articles from the delivery end of the apparatus.

Still another object is to provide an apparatus for stacking and unstacking articles on a pallet in which the loaded pallet is carried on an elevator and a supply of empty pallets is carried on a second elevator, the apparatus being provided with a transfer mechanism for transferring empty pallets, one at a time, from one elevator to the other, at the beginning of the stacking cycle or at the end of the unstacking cycle.

Still another object is to provide an apparatus for receiving a stream of cans and stacking the cans on a pallet in successive layers including friction brake means for interrupting the stream of cans to apportion it into individual loads, a reciprocating loading member for carrying successive loads of cans over the pallet, and a stripper operating in timed sequence with the loading member to strip the cans from the loading member as it is retracted from its position over the pallet.

Other and further objects will be apparent from the drawings and from the description which follows.

In the drawings:

Figs. 1 and 1A are a plan view of one embodiment of the invention, partly broken away for the sake of clarity;

Figs. 2 and 2A are views in side elevation, partly broken away, of the embodiment shown in Figs. 1 and 1A;

Fig. 3 is an end elevation of the machine, partly broken away and with parts removed for the sake of clarity, taken from the left-hand end of Figs. 1 and 2;

Fig. 4 is a detailed cross-sectional view of the upper left-hand portion of Fig. 2, with parts removed for the sake of clarity, and showing the unstacking operation;

Fig. 5 is an enlarged isometric view, partly broken away and in section, showing the construction of a pallet transfer unit D;

Fig. 6 is a view in elevation of the linkage for actuating transfer unit D;

Fig. 7 is a view taken along line 7—7 of Fig. 6;

Fig. 12 is a detailed view in elevation of a portion of the load transfer means, partly broken away and in section, as seen from the right-hand end of Fig. 2;

Fig. 13 is a vertical section along the line 13—13 of Fig. 12;

Fig. 14 is a view in side elevation, partly broken away and with parts removed, showing other details of the load transfer means;

Fig. 15 is a view in side elevation, partly broken away and with parts omitted, showing the drive mechanism for a portion of the load transfer means; and Fig. 16 is a schematic view of the entire machine showing the location of motors and limit switches.

Figure 1A:
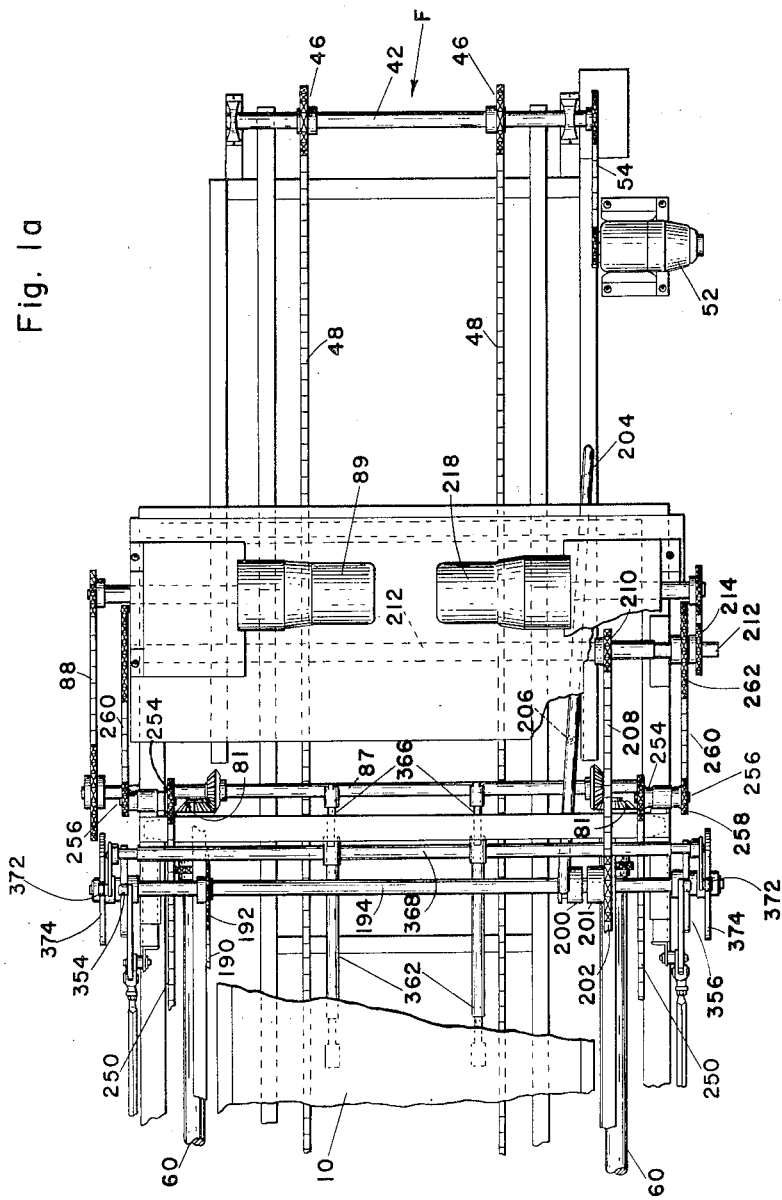

Referring to Figs. 1, 1A, 2 and 2A of the drawings, the apparatus comprises an inclined chute 10 down which a supply stream of cans 12, 12 is fed by gravity. A brake assembly, designated generally by the letter A, is mounted over the outlet end of chute 10 for interrupting the stream of cans. Disposed adjacent the outlet end of chute 10 is a pallet supporting elevator designated generally by the letter B which serves to support pallet 22 while it is being loaded or unloaded. A second elevator adjacent the first, designated generally by letter C, is adapted to carry a supply of empty pallets 26, 26, and a pair of pallet transfer units D, D are mounted adjacent the top of elevators B, C at opposite sides thereof for transferring pallets from one elevator to the other.

A load transfer means E is mounted for reciprocating movement in a generally horizontal plane from a position beneath the outlet end of chute 10 to a fully extended position over elevator B.

In addition to the main frame of the apparatus, including stringers 30, 32 and uprights 34, 36, 38, there is provided an angle iron auxiliary frame 40 extending outwardly from the bottom of elevator C as seen in Fig. 2A and serving to support a chain conveyor F. On the auxiliary frame 40 are journaled shafts 42, 44 carrying sprockets 46, 46 on which are mounted endless conveyor chains 48, 48 which serve to convey empty pallets into elevator C, the pallets resting on chains 48, 48 as they advance into the elevator. A pair of vertically disposed idler rollers 50, 50 are journaled on upright members 38 at each side of conveyor chains 48 to guide the stack of empty pallets carried by chains 48 as it passes into elevator C. Reversible electric motor 52 provided with a chain and sprocket drive 54 serves to drive shaft 42 and conveyor chains 48.

A power driven roller conveyor G for loaded pallets extends into the lower portion of elevator B at right angles to conveyor chains 48, 48 as shown in Figs. 1 and 3. The roller conveyor comprises a series of rollers 54, 54 journaled on auxiliary frame 55, each roller carrying two sprockets 56, 56 keyed to its shaft as shown in Fig. 1, with chains 57, 57 connecting sprockets of adjacent rollers so that all are driven together from chain and sprocket drive 58 and reversible electric motor 59.

Elevators B and C are similar in construction, as shown in Figs. 1, 1A, 2, 2A and 3, each comprising a pair of upper shafts 60, 60 journaled in brackets mounted on uprights 34, 36, 38 and a pair of lower shafts 62, 62 likewise journaled in brackets adjacent the lower end of the uprights. Each of shafts 60, 62 carries a pair of sprockets 64, 64 secured adjacent each end. Endless chains 66, 66, 68, 68 extend in a vertical reach, as seen best in Figs. 2 and 2A, around corresponding upper and lower sprockets at each corner of each elevator. Each elevator chain 66, 66 has secured to it at equally spaced distances along its length one end of a pair of pallet support members 70, 71 and 72, 73, these pallet support members extending parallel to each other and spanning the gap between each pair of chains 66, 66 and 66, 66. Identical pairs of pallet support members 74 (Fig. 3) span the gap between each pair of chains 68, 68 at the rear of the elevators B, C.

Upper shafts 60, 60 of each elevator carry at their outer ends bevel gears 80, 80 and 81, 81. Gears 80, 80 of elevator B mesh with bevel gears 82, 82 secured at the top of vertical shafts 83, 83 (Fig. 3) journaled in brackets mounted on uprights 34, 34. Shafts 83, 83 are driven by bevel gears fixed at their lower ends from horizontal cross shaft 84 which in turn is driven by chain and sprocket drive 85 from reversible motor 86. Gears 81, 81 of elevator C are driven through bevel gears from cross shaft 87, which in turn is driven through chain and sprocket drive 88 from reversible gear motor 89.

The transfer mechanism for transferring an empty pallet from one elevator to the other comprises two transfer units D, D disposed at opposite sides of the machine adjacent the upper ends of the elevators. Each unit D comprises a pair of frame members 90, 92, as best shown in Fig. 5, pivotally mounted at their inner ends upon stub shafts 94, 96 journaled on support member 98, which in turn is welded to upright 36. Drive sheaves 100, 100 and pinion gears 102, 102 are secured to each of shafts 94, 96. Auxiliary frame members 93, 95 are telescopically mounted in frames 90, 92 and are provided with take-up adjustments 97, 99. Idler sheaves 104, 104 are journaled in auxiliary frame members 93, 95. Friction drive belts 106, 106 are trained about each set of sheaves mounted on frames 90, 92, respectively, the tension being adjusted by means of take-ups 97, 99. The belts are driven from sheaves 100, 100 by means of spur gear 110 which meshes with pinion gears 102, 102 and is keyed to shaft 103. The drive shaft 103 of each Unit D at opposite sides of the machine is driven through miter gears from cross shaft 114 (Figs. 1 and 2) which extends the full width of the machine and in turn is driven by chain and sprocket drive 116 from reversible gear reduction motor 118 mounted on a bracket on upright 36.

Figure 2:
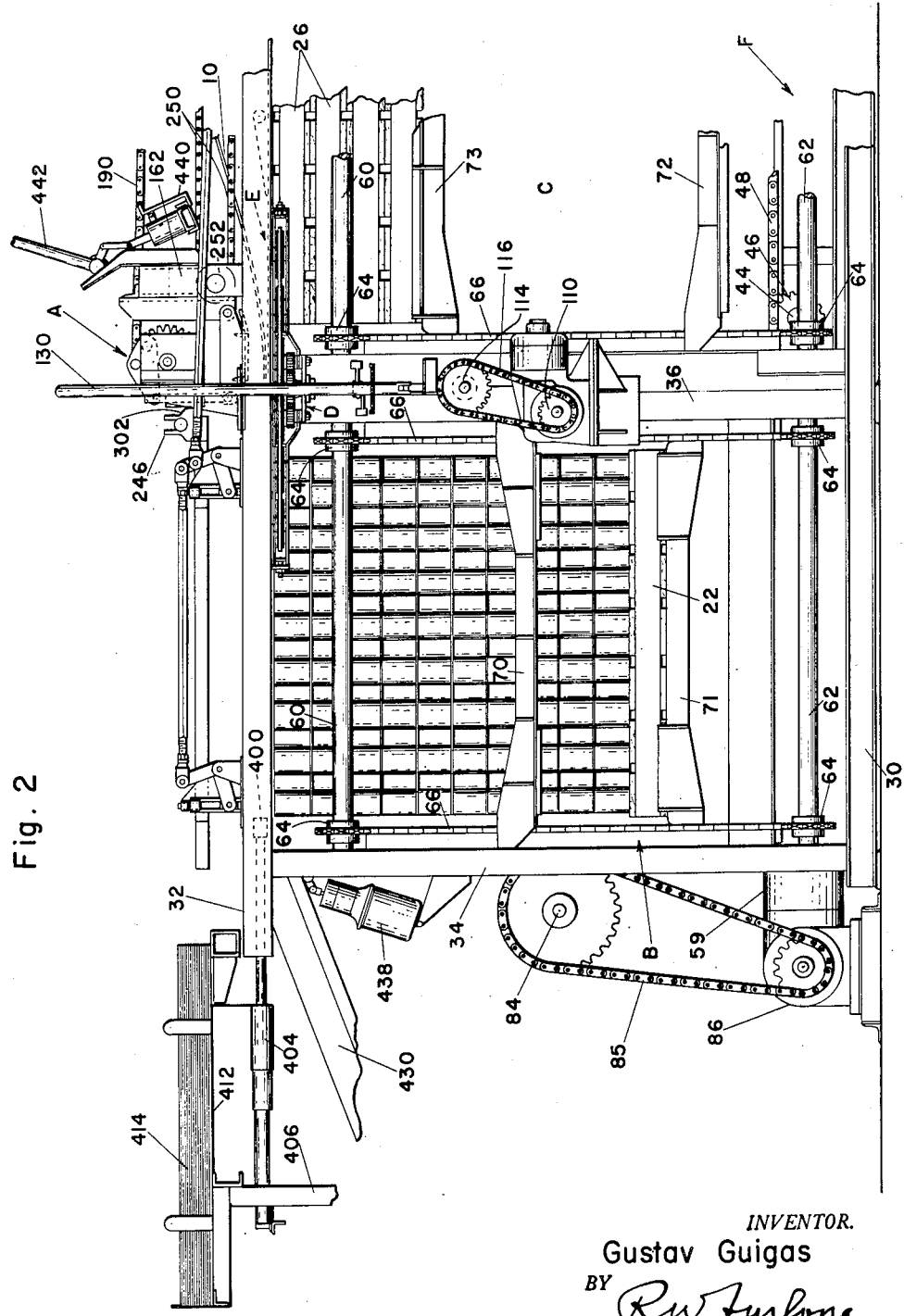
Figure 10:
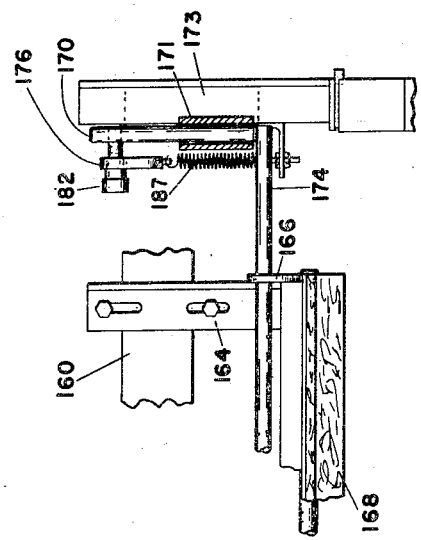
Fig. 10 is a view in elevation of the brake assembly, with parts removed and partly broken away, taken along line 10—10 of Fig. 8.
Figure 11:
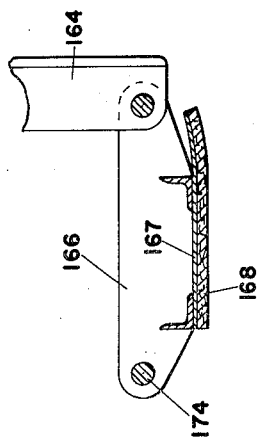
Fig. 11 is a detailed cross-sectional view of the brake shoe frame.
Figure 9:
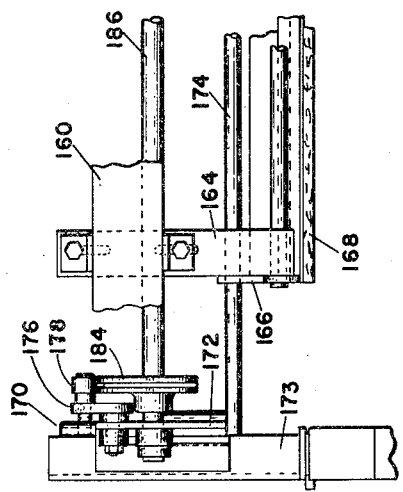
Fig. 9 is a view in elevation of the brake assembly, with parts removed, taken along line 9—9 of Fig. 8.
Figure 8:
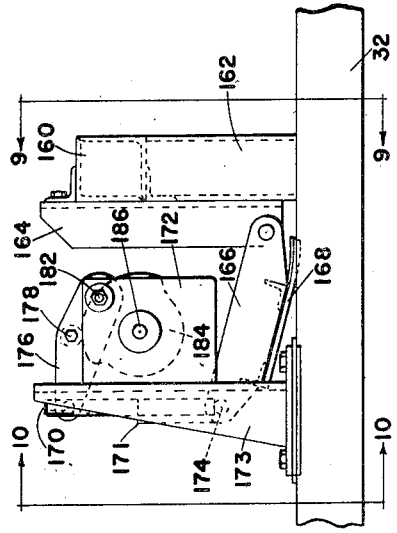
Fig. 8 is a detailed side elevation of brake assembly A with parts removed for the sake of clarity.

As shown in the drawings, each of transfer units D, D is in inoperative position, the frame members 90, 92 extending outwardly. In order to swing these members 90, 92 inwardly toward the sides of the pallet to engage the pallet frictionally by means of drive belts 106, 106, a control mechanism is provided as shown in Figs. 2, 6 and 7 comprising a manually operated lever arm 130 pivoted at its lower end on bracket 132 secured to upright 36. Lever arm 130 carries fixed to it a pair of laterally extending hangers 134, 136, hanger arm 134 being linked at its outer end with the end of lever arm 138 and hanger 136 being linked at its outer end with lever arm 140. Lever arm 138 is keyed to shaft 142, to the upper end of which is keyed a second lever arm 144 linked at its outer end to frame 92. Similarly, hanger arm 136 is linked at its outer end to the end of lever arm 140 which is secured to hollow shaft 146 surrounding shaft 142 and carrying secured adjacent its upper end lever arm 148, which in turn is linked at its outer end to frame 90. Connecting rods 150, 152 extend across the width of the machine in criss-cross fashion to link together each of the two units D, D. It will be apparent that as lever arm 130 is pulled to the left as seen in Fig. 6, the two frame members 90, 92 of each unit D will be swung about their pivots 94, 96 so as to bring friction drive belts 106, 106 to bear against opposite sides of pallet 26 so that operation of motor 118 will cause the topmost pallet to shift laterally from one elevator to the other. Motor 118 is reversible to enable the pallet to be shifted in either direction at will.

Brake assembly A, which is shown most clearly in Figs. 8 to 11, is mounted on cross member 160 which is supported adjacent each end by uprights 162 secured to stringers 32, 32. The brake assembly includes support members 164, 164 adjustably secured to cross member 160 to permit vertical adjustment to accommodate cans of different sizes (heights). At the lower ends of support members 164, 164 is pivotally mounted brake shoe frame 166 carrying brake shoe 167 faced on its lower side with resilient brake lining 168. The control means for actuating the brake includes push rods 170, 170 slidably mounted in sleeves 171, 171 which are secured to plates 172, 172 bolted to brackets 173, 173 mounted on stringers 32, 32 at opposite sides of the machine. Plates 172, 172 are vertically adjustable in the same manner as supports 164, 164. The lower ends of rods 170, 170 bear on cross rod 174 carried by brake shoe frame 166, while the upper ends are pivotally connected to the end of lever arms 176, 176 which are pivotally mounted at 182 on plates 172, 172 secured to brackets 173, 173 at opposite sides of the machine. Each lever arm 176 also carries roller cam follower 178 which rides on each cam 184 secured on opposite ends of shaft 186 journaled in plates 172, 172. Cam followers 178 are urged into engagement with cams 184 by means of tension springs 187 secured between lever arms 176 and brackets 173. These springs serve to lower the brake shoe frame 166 to operative position. Shaft 186 also carries sprocket 188 (Fig. 1) driven by chain 190 from sprocket 192 (Fig. 1A) keyed to shaft 194 journaled in brackets mounted on stringers 32, 32. A jaw clutch having one half 200 splined to shaft 194 and the other half 201 secured to free-running sprocket 202 is provided with a manual control lever 204 pivoted at 206 on a bracket secured to the framework of the machine. Sprocket 202 is driven by chain 208 from sprocket 210 keyed to shaft 212. Shaft 212 in turn carries keyed sprocket 214 driven by chain 216 (Fig. 2A) from electric motor 218. Thus clutch 200, 201 may be manually engaged or disengaged to drive shafts 194 and 186 to rotate cams 184, 184 and push brake shoe frame 166 downwardly by means of bell cranks 176, 176 and push rods 170, 170 in order to frictionally engage the tops of cans 12 sliding down chute 10. This arrangement assures positive control over the stream of cans without risk of denting their sides.

The load transfer means E, best shown in Figs. 12 to 15, comprises a load carrier plate 240 having an upstanding angle iron margin 241 along each longitudinal edge, the plate being supported by four laterally extending rollers 242, two on each side, riding on tracks 244, 244 secured to stringers 32, 32 at each side of the machine, plate 240 being shown approaching its fully retracted position. Adjacent each of the forward corners of carrier plate 240 are mounted slotted uprights 246, 246; a similar pair of slotted uprights 248, 248 are mounted adjacent the rearward corners.

Drive means for reciprocating the carrier plate from its fully retracted position in which it is substantially completely withdrawn beneath the outlet end of chute 10 to its fully extended position in which it overlies pallet 22 on elevator B comprises a pair of endless chains 250, 250 trained about a pair of sprockets 252, 254 at each side of the machine. The forward sprockets 252 are journaled on uprights 162, 162 mounted on stringers 32, 32 while rear sprockets 254 are keyed to stub shafts 256, 256 journaled in brackets on stringers 32. Sprockets 258, 258 (Figs. 1A and 2A) are keyed to the outer ends of stub shafts 256 and are driven by chains 260 from sprockets 262 secured to shaft 212. Shaft 212, as pointed out above, also serves as the drive for the brake assembly. Slidably mounted in the slots of rear uprights 248 are travelers 270 suitably linked to chains 250 by means of pins 272. As chain 250 is driven in the direction indicated by the arrow in Fig. 15, traveler 270 first draws carrier plate 240 to the right as seen in Fig. 15, then, as it passes around sprocket 254, it slides downwardly in the slot of upright 248 to the position shown in dotted lines in Fig. 15. Carrier plate 240 is then urged to the left to its advanced position.

Brake assembly A is actuated by its cams 184, 184 in timed relation to the movement of the load transfer means E so that the brake shoe is raised to release a stream of cans from the outlet end of chute 10 just as carrier plate 240 begins its forward movement, plate 240 carrying the cans forwardly over pallet 22 on elevator B. A pair of side guide rails 290, 292 extend from the outlet end of chute 10 to cross frame member 294 (Figs. 1 and 3) to confine the cans laterally to the width of pallet 22.

A combined stop bar and pusher bar assembly is reciprocated along with carrier plate 240. This assembly is carried by cross member 300 (Figs. 12 and 13) which is secured at each end to roller guide carriages 302 slidably mounted in the slots of forward upright members 246, 246. Stop bar 304 is supported at the bottom end of brackets 306, 306 which are bolted to cross member 300 through slots, as seen in Fig. 12, to permit vertical adjustment of stop bar 304 for cans of varying heights. Stop bar 304, which overlies the forward edge of carrier plate 240 serves as a stop against which the cans are aligned as they slide onto carrier plate 240 when the brake assembly A is released.

Cross member 300 also carries push bar 310 which serves during unstacking operations to push the top layer of cans 12 off the loaded pallet. Push bar 310 is secured to the bottom end of racks 312, 312 slidably mounted in collars 314, 314 mounted on cross member 300. Pinions 316 mounted on shaft 318 engage racks 312 and are actuated by a manual crank handle 320, making it possible to raise push bar 310 into inoperative position above the level of the top layer of cans as shown in Figs. 12 and 13, during stacking or loading operations. For unstacking or unloading operations, crank 320 is employed to lower the pusher bar to the proper level. A spring loaded locking pin 322 (Fig. 12) may be employed to lock the crank handle in the desired position.

Since stop bar 304 is reciprocated along with carrier plate 240 as described above, it is necessary to provide mechanism for raising the stop bar during the loading operation to a position above the top layer of cans while the carrier plate is retracted to its initial position beneath the outlet end of chute 10 in order to permit the cans to be stripped from the carrier plate. Accordingly, a pair of rollers 330, 330 extend laterally outwardly from roller guide carriages 302, 302. These rollers ride upon vertically adjustable auxiliary rails 334, 334 at each side of the machine. Each rail 334 is mounted on brackets 336, 336 secured to the upper ends of connecting rods 338, 338 slidably mounted in collars 340 secured to stringer 32. The lower end of each connecting rod 338 is pivotally connected to one arm of bell cranks 342, 343 pivoted on brackets 344, 344 secured to stringer 32, the other arms of bell cranks 342, 343 being linked together by tie rod 346. In addition, this arm of bell crank 343 is also linked by connecting rod 348 to one arm of bell crank 350 pivotally mounted (Fig. 2A) on upright 352 secured to stringer 32. The other arm of bell crank 350 carries roller cam follower 354 (Fig. 1A) which rides on cam 356 (Fig. 14) keyed to shaft 194. Tension spring 358 is secured between stringer 32 and the cam follower arm of bell crank 350, serving to maintain cam follower 354 against the face of cam 356 and to urge rails 334 to lowered position. Shaft 194 (Fig. 1A) and hence cam 356 are driven, as has been pointed out above, through jaw clutch 200, 201 from shaft 212, which in turn is driven from motor 218.

The stripping means for stripping a layer of cans from carrier plate 240 as it is retracted comprises a stripper plate 360, as best seen in Figs. 12, 14 and 15, slidably mounted on the upper face of carrier plate 240, but reciprocated independently of carrier plate 240 and in timed relation therewith by connecting rods 362, 362 pivotally connected to brackets 364, 364 secured to the rear margin of stripper plate 360. The opposite ends of connecting rods 362, 362 are pivotally connected to lever arms 366, 366 secured on shaft 368 which is journaled in suitable brackets on stringers 32, 32. Also keyed to shaft 368 at opposite ends thereof are additional lever arms 370, 370 carrying at their ends roller cam followers 372, 372 which ride on cams 374, 374 keyed to shaft 194. Tension springs 376, 376 connect lever arms 366, 366 with a part of the framework of the machine so as to urge cam followers 372, 372 into engagement with cams 374, 374 and draw stripper plate 360 into retracted position.

Inasmuch as the movements of carrier plate 240 and its associated stop bar 304 are controlled in timed relation to the movements of stripper plate 360 and brake assembly A by means of the cam and chain drives hereinabove described, the operation of these devices is adjusted so that stripper plate 360 is advanced after brake assembly A has interrupted the supply of cans and just before carrier plate 240 reaches its most extended position. Inasmuch as stop bar 304 is raised above the level of the layer of cans by the action of rails 334, 334 when the carrier plate 240 reaches its most advanced position, an end gate 400 is provided, as seen in Figs. 1 and 2 against which the layer of cans may be compacted by the advancing stripper plate 360 as carrier plate 240 reaches its limit of travel. End gate 400 is mounted on two guide rods 402, 402 slidably mounted in tubular guides 404, 404 secured to auxiliary framework 406 in any suitable manner. Mounted on the framework midway between tubular guides 404, 404 is a double-acting air cylinder 408 controlled by a solenoid operated air valve (not shown). Stops 410, 410 on the ends of guide rods 402, 402 limit the advance of end gate 400 and serve to position it for use during loading operations. During unloading operations, end gate 400 is withdrawn to inoperative position against tubular guides 404, 404.

Auxiliary framework 406 also supports a table 412 (Fig. 2) carrying a supply of cardboard sheets 414 which may be used for interleaving between layers of cans in the stack.

In order to receive the top layers of cans from the stack on the pallet during unloading or unstacking operations, an inclined chute 430 (Fig. 4) is provided, down which the cans 12 slide after being pushed off the stack by pusher member 310. Since it is desirable to space the lip of this chute away from the edge of the stack of cans so as to avoid interference with the stack during loading operations, an auxiliary lip 432 (Fig. 4) is provided which serves not only to extend chute 430 very close to the edge of the stack, reducing the clearance and thus preventing the edges of the cans from catching on the margin of the chute as they are pushed off the stack, but, in addition, serves to stabilize the layer of cans next beneath that being unloaded, as is clearly shown in Fig. 4. Lip 432 is slidably mounted and is connected by link 434 to one arm of a bell crank 436 pivoted on the frame of chute 430. The other arm of bell crank 436 is connected to an electric thrustor 438 which serves to advance or retract auxiliary lip 432.

As a safety measure, a manually operated brake or gate 440 (Fig. 2) may be pivotally mounted on cross member 160 and provided with a handle 442 for manual actuation to interrupt the stream of cans coming down chute 10 if for any reason brake assembly A is inoperative.

The supply stream of cans for the machine may be provided from any suitable conveyor (not shown) in a conventional manner. Similarly, the cans supplied by the machine during unloading operation through outlet chute 430 may be handled by any conventional can handling machinery as desired.

It will be understood that a suitable walkway (not shown) may be provided for the operator to stand on to operate control lever 130 for actuating the transfer units D, D and to operate clutch handle 204 as well as to place cardboard sheets 414 between layers of cans during the stacking operation and to remove them during the unstacking operation.

The machine may be operated by starting and stopping the several motors at the proper times by means of manually operated push buttons, if desired. The operation of the device also may be partly or entirely automatic. There is shown in Fig. 16 a schematic representation indicating an arrangement of limit switches and photoelectric cells for rendering operation of the machine largely automatic. These switches and their operation are as follows. It will be noted that during the stacking operation only L-1, L-2, L-5, L-6, L-8, L-9, L-10, L-10A, L-11, L-14, and L-16 are operative, while during the unstacking operation only L-1, L-3, L-4, L-7, L-12, L-13, L-14, L-15, and L-17 are operative.

| Symbol | Operation |
|---|---|
| L-1 | Limit switch opened by lug on chain 250 as carrier plate 240 reaches retracted position, stopping motor 218. |
| L-2, L-2 | Photoelectric relay opened when light beam passes across as loaded pallet descends on elevator B, stopping motor 86 with elevator in position to receive new layer of cans. |
| L-3, L-3 | Photoelectric relay, opened when light beam is broken as loaded pallet rises on elevator B, stopping motor 86 with elevator in position for unloading top layer of cans. |
| L-4 | Limit switch closed by lug on chain 66 of rising elevator B, stopping motor 86 with pallet support members 70 and 71 in position to clear incoming loaded pallet as delivered by roller conveyor G. |
| L-5 | Limit switch closed by lug on chain 66 of elevator B when last layer of cans has been placed on pallet 22, causing photoelectric relay L-2 to become inoperative and limiting height of stack. |
| L-6 | Limit switch closed by top pallet on elevator C as elevator rises, stopping motor 89 with top pallet in position to be removed by transfer units D, D. |
| L-7, L-7 | Photoelectric relay opened by light beam passing top pallet on elevator C as elevator descends, stopping motor 89 with top pallet in position to receive empty pallet from transfer units D, D. A second contact on this relay is closed by the light beam, opening when the empty pallet received from transfer units D, D is centered in elevator C and stopping motor 118. |
| L-8 | Limit switch opened by pallet moving into elevator B from transfer units D, D stopping motor 118 with pallet centered in elevator. |
| L-9 | Limit switch opened by lug on chain 66 of elevator B, stopping motor 86 with pallet support members 70 or 71 in position to receive empty pallet from transfer units D, D. |
| L-10 | Limit switch closed by loaded pallet descending onto roller conveyor G, starts motor 59. |
| L-10A | Limit switch closed by loaded pallet passing along roller conveyor G to keep motor 59 running, opens when loaded pallet clears elevator B to stop motor 59. |
| L-11 | Limit switch opened by lug on chain 66 of elevator C, stopping motor 89 with pallet support members 72 and 73 in position to receive an empty pallet from elevator B when unstacking. |
| L-12 | Limit switch closed by lug on chain 66 of elevator C when elevator has received full stack of pallets, cutting out L-7 so that stack may be lowered onto chain conveyor F. |
| L-13 | Limit switch opened by loaded pallet entering elevator B on roller conveyor 18, stopping motor 59 with pallet centered in elevator. |
| L-14 | Limit switch opened by lever 130 when transfer units D, D are actuated, cutting out L-7 to maintain elevator C stationary during transfer of pallet. |
| L-15 | Limit switch opened by clutch handle 204 when clutch is engaged for stacking operation, thereby preventing actuation of thrustor 433. |
| L-16 | Limit switch opened by stack of empty pallets entering elevator C on chain conveyor F, stopping motor 52 with stack of pallets centered in elevator. |
| L-17 | Limit switch closed by stack of empty pallets descending onto chain conveyor F from elevator C, starting motor 52. |

These switches and photoelectric relays are connected, along with motors 52, 59, 86, 89, 118, and 218, to a master control with suitable conventional circuits including push button starting controls for starting the various motors in the proper direction for stacking or unstacking as the case may be.

*Stacking operation*

A stack of empty pallets is placed on chain conveyor F while the latter is stationary. The operator then starts elevator C by means of a push button on the master control, the elevator running until stopped by limit switch L-11 with pallet supporting members 72 and 73 in position to clear the stack of pallets as it is advanced into the elevator. Chain conveyor F is then started by means of a push button and runs until stopped by limit switch L-16 with the stack of pallets properly centered in elevator C. Elevator C is then re-started, raising the stack of empty pallets until stopped by limit switch L-6 with the top pallet in position to be transferred by transfer units D, D.

Elevator B is now started and allowed to run until stopped by limit switch L-4, positioning pallet support members 70 or 71 in the proper location to receive a pallet from transfer units D, D. Motor 118 is now started and the operator pulls lever 130 to swing transfer units D, D against the sides of the top pallet on elevator C, transferring it laterally to elevator B, motor 118 being automatically stopped by limit switch L-8 when the pallet is properly centered in elevator B. Pneumatic air cylinder 408 is now actuated to advance end gate 400 to a position adjacent the margin of pallet 22, and thrustor 438 is actuated if necessary to withdraw chute extension 432 away from pallet 22. A sheet of cardboard from the stack on table 412 is placed by the operator on pallet 22, being stapled thereto if desired. Push bar 310 is raised to inoperative position by means of crank 320 and locked with pin 322.

Chute 10 being filled with a supply of cans, the operator now shifts clutch handle 204 to engage the clutch and starts motor 218 by means of "stacking" starting button. This motor, driving shafts 212 and 194 with their associated cam and chain drives, (1) releases brake assembly A permitting cans to slide by gravity down chute 10, (2) actuates the load transfer means by advancing carrier plate 240 together with stop bar 304. The stream of cans 12, therefore, slides onto the advancing carrier plate, being urged against stop bar 304 by the gravity feed and being restrained laterally by guide rails 290, 292. When carrier plate 240 reaches a predetermined point in its advance, and thus carries a predetermined number of cans, brake assembly A is actuated by its cams 184, 184 to bear upon the tops of the cans beneath it and stop the flow of cans. Carrier plate 240 continues to advance and stripper plate 360 begins its advance, sliding on the top of carrier plate 240 as controlled by its cams 374, 374. As carrier plate 240 reaches the limit of its forward travel, auxiliary rails 334, 334 are raised by the action of cams 356, 356, thus lifting stop bar 304 above the top of the layer of cans carried by plate 240. Stripper plate 360 continues its advance momentarily, thus compacting the layer of cans against end gate 400. Carrier plate 240 then begins its retraction along with end gate 304 while stripper plate 360 remains stationary. As carrier plate 240 is withdrawn from beneath the layer of cans, they are deposited upon the sheet of cardboard upon pallet 22. As the forward margin of carrier plate 240 clears the rearmost row of cans in the layer being deposited, stripper plate 360 is actuated by its cams 374, 374 and begins its rearward travel along with carrier plate 240. Immediately before the carrier plate reaches its fully retracted position, rails 334, 334 are again lowered by the action of their cam 356, dropping stop bar 304 to its original position. When stripper plate 360 and carrier plate 240 reach their fully retracted position, a lug on chain 250 which drives carrier plate 240 opens limit switch L-1, stopping motor 218. The opening of limit switch L-1 also starts motor 86, causing elevator B to move downwardly until stopped by photoelectric relay L-2 after traveling a distance equal to one can height.

The operator now places a new sheet of cardboard over the layer of cans on pallet 22 and again pushes the "stacking" starting button to start motor 218, repeating the cycle of operations described above.

After the last layer of cans has been deposited upon the pallet to form the complete stack of the desired height, limit switch L–5 actuated by a lug on chain 66 of elevator B cuts out photoelectric relay L–2 and causes motor 86 to continue running until the loaded pallet is deposited upon roller conveyor G. The elevator continues to run after depositing the loaded pallet until stopped by limit switch L–9 with pallet supporting members 70 or 71 in position to receive another empty pallet from the transfer units D, D.

As the loaded pallet is deposited upon roller conveyor G, limit switch L–10 is closed by the pallet, starting motor 59 which actuates the conveyor G. As the loaded pallet clears the elevator B, limit switch L–10A, which has taken over from limit switch L–10, is released, stopping motor 59.

When a pallet has been removed from elevator C by transfer units D, D, elevator C may be re-started manually, being stopped again by limit switch L–6 in proper position.

*Unstacking operation*

A loaded pallet carrying a stack of cans is deposited upon roller conveyor G. Motor 86 is started by "unstacking" push button to actuate elevator B, being stopped by limit switch L–4 with pallet supporting members 70 or 71 in position to clear the incoming loaded pallet. Motor 89 of elevator C is then started and runs until stopped by limit switch L–11 with pallet support members 72 or 73 in position to receive a pallet from transfer units D, D. End gate 400 is withdrawn by actuation of pneumatic cylinder 408, and clutch 200, 201 is disengaged by means of handle 204.

Motor 59 driving roller conveyor G is started, moving the loaded pallet into elevator B, being stopped by limit switch L–13 with the loaded pallet properly centered in the elevator. Motor 86 of elevator B is then re-started, raising the loaded pallet until stopped by photoelectric relay L–3 with the top layer of cans at the proper level. This photoelectric relay, since limit switch L–15 is now closed, also actuates thrustor 438, causing auxiliary lip 432 of the outlet chute to be extended. Push bar 310 is then lowered by means of crank 320 to the proper position for engaging the top layer of cans. Motor 218 is then started, causing push bar 310 to be advanced across elevator B, the push bar being carried by forward uprights 246, 246 on carrier plate 240 driven from chains 250, 250. Since clutch 200, 201 has been disengaged, brake assembly A remains in the closed position, stripper plate 360 remains stationary in its retracted position, and rails 334, 334 remain in their lowered position so that push bar 310 simply moves back and forth in a horizontal path. As push bar 310 advances, it pushes the top layer of cans off the stack between guide rails 290, 292 onto the sloping delivery chute 430. As the push bar 310 returns to its fully retracted position, a lug on drive chain 250 actuates limit switch L–1, stopping motor 218. The operator then removes the sheet of cardboard from the top of the stack. Motor 86 of elevator B is then started by a push button which simultaneously actuates thrustor 438 to withdraw auxiliary lip 432, elevator B continuing to rise until motor 86 is stopped by photoelectric relay L–3, which again actuates thrustor 438 to advance auxiliary lip 432. The elevator has risen a distance of one can height so that the second layer of cans is properly positioned to be removed.

The starting button may then be employed to start motor 218 again and repeat the cycle.

When the last layer of cans has been removed from the pallet, motor 118 is started and lever 130 is moved manually to cause transfer units D, D to engage opposite sides of the empty pallet and transfer it from elevator B to elevator C. Elevator C is then started downwardly, continuing until stopped by photoelectric relay L–7 in position to receive another empty pallet on its upper face.

A new loaded pallet may then be advanced into elevator B on roller conveyor G as described above.

When elevator C has received a full stack of empty pallets, limit switch L–12 is closed by the descending elevator, cutting out photoelectric relay L–7 and causing the entire stack to be lowered onto chain conveyor F where it contacts limit switch L–17, starting motor 52 which drives conveyor F and conveys the stack of empty pallets out of the elevator.

Although specific embodiments of the invention have been described herein, it is not intended to limit the invention solely thereto, but to include all of the obvious variations and modifications within the spirit and scope of the appended claims.

I claim:

1. An apparatus for loading articles upon a pallet including feed means for supplying a stream of said articles, pallet support means, a loading member mounted for generally horizontal reciprocating movement over said pallet support means, said loading member receiving said articles from the feed means to carry them over the pallet and including a stop member mounted adjacent its forward edge movable to and from an operative position in which it engages the foremost row of articles upon the loading member and an inoperative position in which it is clear of said articles, means for interrupting said supply stream when the loading member has received a load of articles, means for reciprocating the loading member to and from a position over the pallet, and means for stripping the articles from the loading member to form a layer upon the pallet as the loading member is withdrawn from its position over the pallet, said stripping means including a stripper member mounted over said loading member for reciprocating movement in the same direction as the loading member, means for advancing said stripper member in timed sequence with said loading member to engage the rearmost row of articles on the loading member while the loading member is withdrawn from beneath the load and for retracting the stripper member to its original position, and means for moving the movable stop member to inoperative position while the loading member is being withdrawn and moving it to operative position while the loading member is being advanced.

2. An apparatus as defined in claim 1 comprising in addition means for increasing the spacing between said pallet support means and said loading member by an amount equal to the height of the load after each load is deposited upon the pallet, whereby a stack of articles is formed upon the pallet by the deposit of successive loads.

3. An apparatus for loading articles upon a pallet including feed means for supplying a stream of said articles, means for supporting a pallet in loading position, a loading member mounted for generally horizontal reciprocating movement to and from a position over said pallet, said loading member receiving said articles from the feed means to carry them over the pallet, means for interrupting said supply stream when the loading member has received a load of articles, means for reciprocating the load member to and from a position over the pallet, and means for stripping the load of articles from the loading member to deposit the load upon the pallet as the loading member is withdrawn from its position over the pallet, said stripping means including a stripper member mounted for reciprocating movement in the same direction as the loading member, and means for advancing the stripper member in timed sequence with the loading member to engage the rearmost row of articles in the load while the loading member is withdrawn from beneath the load and for returning the stripper member to its original position.

4. An apparatus for loading articles upon a pallet comprising a feed chute for supplying a stream of articles, means for supporting a pallet adjacent said feed chute in loading position, a load transfer member mounted for generally horizontal reciprocation to and from a position over the pallet and a position beneath the outlet end of said feed chute, a friction brake extending across said chute adjacent its outlet adapted to bear upon the upper face of the stream of articles to interrupt the stream, means for reciprocating said load transfer member and for actuating said brake in timed relation to each other whereby said load transfer member receives articles from the feed chute as it advances from its position therebeneath and the stream of articles is interrupted by the brake when the transfer member has advanced a predetermined distance, a stop member mounted adjacent the forward end of the transfer member and reciprocable therewith, said stop member being movable to and from an operative position in which it engages the foremost row of articles on the transfer member and an inoperative position in which it is clear of the load of articles, a stripper member mounted for reciprocation in the same direction as the transfer member and engageable with the load of articles carried by the transfer member, means for reciprocating the stripper member in timed relation to the transfer member and brake to advance the stripper member after the feed stream has been interrupted to engage the rearmost row of articles upon the transfer member and compact the load of articles against the stop member and to hold the articles while the transfer member is withdrawn from beneath the load, and means for moving the stop member to inoperative position before the transfer member begins its return and for returning the stop member to operative position after return of the transfer member.

5. An apparatus for stacking articles upon pallets and unstacking articles from pallets including an elevator for loaded pallets and an elevator for empty pallets, means for transferring a pallet from one elevator to the other comprising a generally horizontally disposed conveyor means including a driven friction face disposed at a side of the path of the pallet and mounted for movement toward and away from an inoperative position out of the path of the pallet and an operative position in which said conveyor means friction face frictionally engages a side of a pallet carried by one elevator to move it onto the other elevator, and means for moving said conveyor means to and from operative and inoperative position.

6. An apparatus as defined in claim 5 in which a plurality of said conveyor means are provided at opposite sides of the path of the pallet.

7. An apparatus for stacking articles upon pallets and unstacking articles from pallets including an elevator for loaded pallets and an elevator for empty pallets, and means for transferring a pallet from one elevator to the other comprising continuous driven belts disposed at opposite sides of the path of the pallet, each belt having a generally horizontal reach mounted for lateral movement toward and away from an inoperative position outside the path of the pallet and an operative position in which each belt frictionally engages a pallet at opposite sides thereof, means for moving each said horizontal reach to and from operative and inoperative position, and means for driving said belts to move a pallet from one elevator to the other.

8. An apparatus for stacking articles upon pallets and unstacking articles from pallets including an elevator for supporting loaded pallets and an elevator for supporting empty pallets, said elevators being disposed adjacent each other, and means for transferring a pallet from one elevator to the other while said elevators are in raised position comprising a driven endless belt mounted at each side of the path of the pallet, each belt having a generally horizontally extending reach swingably mounted adjacent one end thereof for lateral swinging movement toward and away from the path of the pallet, means for driving said belts, and means for simultaneously swinging the belts at opposite sides of the path to and from an inoperative position in which said belts are outside the path and an operative position in which the belts frictionally engage opposite sides of a pallet in one elevator to transfer it to the other elevator.

9. An apparatus for stacking articles upon pallets which comprises an elevator for holding a stack of empty pallets, a second elevator for holding a pallet while it is being loaded, friction drive means for transferring the top pallet from the first elevator to the second elevator, a feed chute having a delivery end for supplying a stream of articles adjacent the upper end of the second elevator, a sliding carrier mounted for reciprocation to and from a position beneath the delivery end of the feed chute and a position above the pallet to be loaded, said carrier being adapted to receive and carry a load of articles from said feed chute as it advances over the pallet, a stop member mounted adjacent the forward edge of said carrier normally in an operative position in which it engages the foremost row of articles on the carrier and movable to an inoperative position in which it clears the articles on the carrier, a feed interrupter mounted adjacent the delivery end of the feed chute adapted to interrupt the stream of articles from the chute, means for reciprocating said carrier and actuating the feed interrupter in timed relation whereby a load of articles is deposited upon said carrier as it advances forwardly and the supply of articles is stopped as the carrier reaches a predetermined point in its forward travel, a sliding stripper mounted for reciprocation above the carrier in the same direction as the carrier, means for actuating the stripper in timed relation to the carrier and feed interrupter to advance the stripper to engage the rearmost row of articles on the carrier after the stream of articles has been stopped, to maintain the stripper stationary in contact with said articles while the carrier is withdrawn from beneath the load of articles to deposit the load on the underlying pallet, and finally to withdraw the stripper, means for moving the stop member to inoperative position as the carrier reaches its position over the pallet, for maintaining the stop member in an inoperative position as the carrier is withdrawn from beneath the load, and for returning the stop member to operative position as the carrier reaches its fully retracted position, and means for lowering the elevator by a distance equal to the height of the load after each load is deposited, whereby successive loads deposited on the pallet form a stack.

10. An apparatus for loading articles upon a pallet comprising feed means for supplying said articles, means for supporting a pallet in loading position, a load carrier mounted for generally horizontal reciprocation to and from a position over the pallet to be loaded, said carrier being adapted to receive articles from the feed means as the carrier advances over the pallet, means for advancing and retracting said carrier, means for stripping articles from the carrier to deposit them on the pallet as the carrier is retracted from its position over the pallet, a stop member mounted adjacent the forward edge of the carrier for reciprocation therewith, said stop member being movable to and from an operative position in which it engages the foremost row of articles on the carrier and an inoperative position in which it clears the articles on the carrier, and means for maintaining said stop member in operative position as the carrier is advanced and for maintaining it in inoperative position as the carrier is retracted.

11. An apparatus for interchangeably loading and unloading layers of articles on a pallet comprising a pallet support, feed means for supplying articles, and load transfer means mounted for generally horizontal sliding movement to and from a position adjacent the pallet support and a position over the pallet support, said load transfer means including a carrier plate adapted to receive a layer of articles from said feed means during loading operation for carrying them over the pallet and including an article discharge member adjustably mounted for generally vertical movement to and from unloading position in which it engages a layer of articles on the pallet and loading position in which it is above the articles on the pallet, means for moving said article discharge member to and from loading and unloading position, means for reciprocating said load transfer means, and stripper means for stripping the layer of articles from the load transfer means as it is retracted from its position over the pallet to deposit the layer of articles on the pallet during the loading operation.

12. An apparatus as defined in claim 11 comprising in addition means for varying the spacing between the pallet support and the load transfer means by a distance equal to the height of one layer after each successive reciprocation of the load transfer means, whereby successive layers are stacked upon the pallet during the loading operation and successive layers are removed from a stack upon the pallet during the unloading operation.

13. An apparatus as defined in claim 12 in which the means for varying the spacing comprises an elevator for the pallet support.

14. An apparatus as defined in claim 13 comprising in addition means for holding the second layer from the top of the stack against movement during the unloading operation.

15. An apparatus as defined in claim 13 comprising in addition means for interrupting the supply of articles during the loading operation each time the load transfer means receives a full layer until after the layer has been stripped therefrom and for stopping the supply of articles during the unloading operation.

16. An apparatus as defined in claim 13 comprising in addition a second elevator for holding a stack of empty pallets, and means for transferring an empty pallet from one elevator to the other at the beginning of the stacking operation and at the end of the unstacking operation.

References Cited in the file of this patent

UNITED STATES PATENTS

| | | |
|---|---|---|
| 1,208,802 | Lienau et al. | Dec. 19, 1916 |
| 2,028,410 | Rapisarda | Jan. 21, 1936 |
| 2,508,861 | Jessen | May 23, 1950 |
| 2,633,251 | Bruce | Mar. 31, 1953 |
| 2,703,182 | Broberg et al. | Mar. 1, 1955 |